US009886286B2

United States Patent
Lin et al.

(10) Patent No.: US 9,886,286 B2
(45) Date of Patent: Feb. 6, 2018

(54) COMMUNICATION MODULE, COMMUNICATION DEVICE CAPABLE OF SELF-DETECTING OPERATION STATUS AND DETECTING METHOD THEREOF

(71) Applicant: AIROHA TECHNOLOGY CORP., Hsinchu (TW)

(72) Inventors: Heng-Chih Lin, Hsinchu (TW); Chien-Kuang Lee, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 100 days.

(21) Appl. No.: 15/001,363

(22) Filed: Jan. 20, 2016

(65) Prior Publication Data
US 2016/0232011 A1    Aug. 11, 2016

(30) Foreign Application Priority Data

Feb. 5, 2015  (TW) .............................. 104103854 A

(51) Int. Cl.
*G06F 9/44*    (2006.01)
(52) U.S. Cl.
CPC ................... *G06F 9/4411* (2013.01)
(58) Field of Classification Search
CPC .................................................. G06F 9/4411
See application file for complete search history.

(56) References Cited

U.S. PATENT DOCUMENTS

| 2007/0156370 | A1* | 7/2007 | White | G06F 1/206 |
|---|---|---|---|---|
| | | | | 702/132 |
| 2013/0135043 | A1 | 5/2013 | Hietala et al. | |
| 2013/0185574 | A1* | 7/2013 | Nishikawa | G06F 1/3296 |
| | | | | 713/320 |
| 2013/0197850 | A1 | 8/2013 | Yu et al. | |
| 2014/0325103 | A1 | 10/2014 | Leitner et al. | |
| 2015/0056941 | A1* | 2/2015 | Lin | H04B 1/18 |
| | | | | 455/352 |

OTHER PUBLICATIONS

MIPI RF Front-End Interface (RFFE), Dec. 20, 2010, MIPI Alliance, 4 pages.*

* cited by examiner

*Primary Examiner* — Stefan Stoynov
(74) *Attorney, Agent, or Firm* — Rosenberg, Klein & Lee

(57) ABSTRACT

The present invention is related to a communication device capable of self-detecting operation status and detecting method thereof. The communication device comprises at least one communication module and a control module. The communication module is capable of self-detecting operation status, so as to generate at least one status information. The control module is allowed to read out the status information of the communication module via a Mobile Industry Processor Interface (MIPI). When the need for the adjustment of operation status of the communication module is diagnosed by the control module, a control signal is generated, and the control signal is transmitted to the communication module via the MIPI, so as to adjust operation status of the communication module. As such, the communication module may be operated under its best status, and also reduce the probability of overheating or abnormal operation.

22 Claims, 8 Drawing Sheets

COMMUNICATION MODULE, COMMUNICATION DEVICE CAPABLE OF SELF-DETECTING OPERATION STATUS AND DETECTING METHOD THEREOF

CROSS-REFERENCE TO RELATED APPLICATIONS

This non-provisional application claims priority claim under 35 U.S.C. § 119(a) on Taiwan Patent Application No. 104103854 filed Feb. 5, 2015, the entire contents of which are incorporated herein by reference.

FIELD OF THE INVENTION

The present invention is related to a communication module, communication device and detecting method thereof, particularly to a communication module, communication device capable of self-detecting operation status and detecting method thereof.

BACKGROUND

As communication technology advances with each passing day, communication devices (e.g., smart phones, tablets) are more and more functional. People often apply the communication devices to life, such as phone calls, internet access, online chat, and etc.

However, the more powerful the function of the communication device is, the more complex the circuit design is. Normal operation status of the communication devices, manufactured at different times, may be apt to deviate due to variation in the manufacturing process because of the complex circuit design. Additionally, it is also possible for the communication devices to deviate from the best operation status gradually owing to long-term usage.

In addition, the problem of overheating is apt to occur in some high power communication devices. When the overheating of a communication device occurs, communication modules in the communication device are apt to operate abnormally, even burn out.

In view of the fact, the present invention provides a communication device capable of self-detecting and self-adjusting operation status, such that the communication device may be operated under its best status at all times, with reduced probability of overheating or abnormal operation, which will be the object of the present invention.

SUMMARY

It is one object of the present invention to provide a communication device capable of self-detecting operation status, comprising at least one communication module and a control module. The communication module is capable of detecting operation status, so as to generate at least one status information. The control module is allowed to read out the status information of the communication module via a Mobile Industry Processor Interface (MIPI), so as to be informed of current operation status of the communication module.

It is another object of the present invention to provide a communication device capable of self-detecting operation status. When the need for the adjustment of operation status of a communication module is diagnosed by a control module, a control signal is generated by the control module and the control signal is transmitted to the communication module via a MIPI, so as to adjust operation status of the communication module, such that the communication module may be operated under its best status.

It is another object of the present invention to provide a communication device capable of self-detecting operation status, in which a control module is allowed to read out the status information of a plurality of communication modules in the meanwhile, so as to control operation status of one or more communication modules at the same time.

For achieving above objects, the present invention provides a communication module capable of self-detecting operation status, comprising: a detecting unit, configured to detect operation status of the communication module, so as to generate at least one status information; and a first Mobile Industry Processor Interface (MIPI), used by the communication module to transmit the status information.

The present invention also provides another communication device capable of self-detecting operation status, comprising: at least one communication module, comprising: a detecting unit, configured to detect operation status of the communication module, so as to generate at least one status information; and a first Mobile Industry Processor Interface (MIPI); and a control module, comprising: a second MIPI, used by the control module to connect with the first MIPI of the communication module; and a processing unit, connected with the second MIPI, so as to read out the status information in the communication module via the first MIPI and the second MIPI.

In one embodiment of the present invention, when the need for the adjustment of operation status of the communication module is determined by the processing unit of the control module diagnosing the status information of the communication module, at least one control signal is generated by the processing unit and the control signal is transmitted to the communication module via the second MIPI and the first MIPI, so as to adjust operation status of the communication module.

The present invention also provides another communication device capable of self-detecting operation status, comprising: at least one communication module, comprising: a detecting unit, configured to detect operation status of the communication module, so as to generate at least one status information; a first processor; and a first Mobile Industry Processor Interface (MIPI); and a control module, comprising: a second MIPI, used by the control module to connect with the first MIPI of the communication module; and a processing unit, connected to the second MIPI, so as to read out the status information in the communication module via the first MIPI and the second MIPI.

In one embodiment of the present invention, when the need for the adjustment operation status of the communication module is determined by the first processor of the communication module diagnosing the status information of the communication module, at least one control signal is generated by the first processor, so as to adjust operation status of the communication module.

In one embodiment of the present invention, the first processor of the communication module is allowed to read out the status information of other communication modules via the first MIPI, and when the need for the adjustment of operation status of other communication modules is determined by the first processor of the communication module diagnosing the status information of other communication modules, one or more control signals are generated, and then, the control signals are transmitted to other communication modules whose operation status are required adjustment via the first MIPI.

The present invention also provides another communication device capable of self-detecting operation status, comprising: at least one communication module, comprising: a detecting unit, configured to detect operation status of the communication module, so as to generate at least one status information; a first Mobile Industry Processor Interface (MIPI); and a first General Purpose Input/Output (GPIO) interface; and a control module, comprising: a second MIPI, used by the control module to connect with the first MIPI of the communication module; a second GPIO interface, used by the control module to connect with the first GPIO interface of the communication module; and a processing unit, connected to the second MIPI and the second GPIO interface, the processing unit reading out the status information in the communication module or changing operation status of the communication module via the first MIPI and the second MIPI, or via the first GPIO interface and the second GPIO interface.

In one embodiment of the present invention, when the need for the adjustment of operation status of the communication module is determined by the processing unit of the control module diagnosing the status information of the communication module via the second GPIO interface and the first GPIO interface, at least one control signal is generated by the processing unit and the control signal is transmitted to the communication module via the second MIPI and the first MIPI, so as to adjust operation status of the communication module.

In one embodiment of the present invention, when the need for the adjustment of operation status of the communication module is determined by the processing unit of the control module diagnosing the status information of the communication module via the second MIPI and the first MIPI, at least one control signal is generated by the processing unit and the control signal is transmitted to the communication module via the second GPIO interface and the first GPIO interface, so as to adjust operation status of the communication module.

In one embodiment of the present invention, the processing unit of the control module is allowed to read out the status information of a plurality of the communication modules via the first MIPI and the second MIPI, and when the need for the adjustment of operation status of a part of the communication modules is determined by the processing unit of the control module diagnosing the status information of each of communication modules, a plurality of control signals are generated, and then, each of control signals is transmitted to each of communication modules whose operation status is required adjustment, respectively, via the first MIPI and the second MIPI.

In one embodiment of the present invention, the control module is a baseband chip, a radio-frequency chip, or a processor chip.

In one embodiment of the present invention, the communication module is a transmitter module, a receiver module, a power amplifier module, an antenna switch module or a front end module.

In one embodiment of the present invention, the communication module further comprises a register used for storing the status information and arranged between the detection unit and the first MIPI.

The present invention also provides another communication device capable of self-detecting operation status, comprising: at least one communication module, comprising: a detecting unit, configured to detect operation status of the communication module, so as to generate at least one status information; a first processor; a first Mobile Industry Processor Interface (MIPI); and a first General Purpose Input/Output (GPIO) interface; and a control module, comprising: a second MIPI, used by the control module to connect with the first MIPI of the communication module; a second GPIO interface, used by the control module to connect with the first GPIO interface of the communication module; and a processing unit, connected to the second MIPI and the second GPIO interface, the processing unit reading out the status information in the communication module or changing operation status of the communication module via the first MIPI and the second MIPI, or via the second GPIO interface and the first GPIO interface.

The present invention also provides another method for detecting operation status of a communication device, the communication device comprising a control module and at least one communication module, the control module and the communication module being provided with a MIPI, respectively, the control module and the communication module being connected with each other via the MIPIs, the method comprising the steps of: self-detecting operation status of the communication module so as to generate at least one status information; storing the status information into a register of the communication module; and reading out the status information in the communication module by the control module via the MIPIs.

In one embodiment of the present invention, the detecting method of operation status further comprising the steps of: generating a control signal when the need for the adjustment of operation status of the communication module is determined by the control module diagnosing the status information of the communication module; and transmitting the control signal generated by the control module to the communication module via the MIPIs, so as to adjust operation status of the communication module.

In one embodiment of the present invention, the detecting method of operation status further comprising the steps of: generating a control signal when the abnormal operation status of the communication module is determined by the control module diagnosing the status information of the communication module; and transmitting the control signal generated by the control module to the communication module via the MIPIs, so as to adjust operation status of the communication module.

DETAILED DESCRIPTION OF THE PREFERRED EMBODIMENTS

Figure 1:
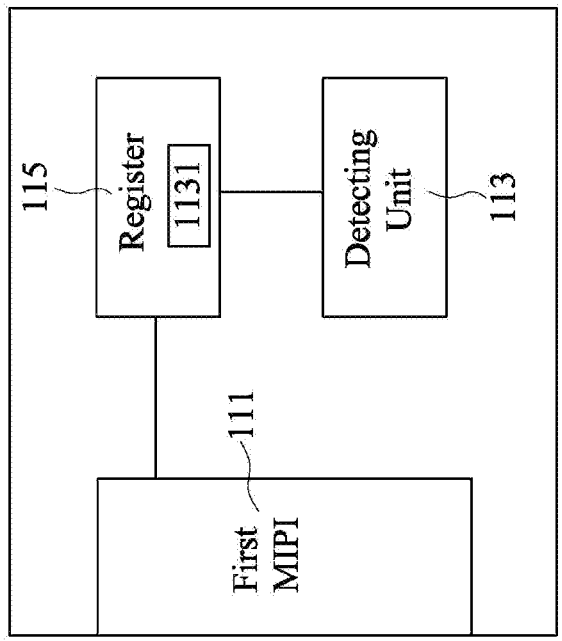
FIG. 1 is a structural diagram of a communication module according to one embodiment of the present invention.

Referring to FIG. 1, there is shown a structural diagram of a communication module according to one embodiment of the present invention. The communication module 11 of the present invention may be arranged in a communication device. The communication module 11 can be a transmitter module (TxM), a receiver module (RxM), a power amplifier module (PAM), a front end module (FEM), an antenna switch module (ASM), or a communication-related module.

The communication module 11 comprises a first mobile industry processor interface (MIPI) 111, a detecting unit 113 and a register 115. The first MIPI 111 and the detecting unit 113 are connected to the register 115, respectively.

When the communication module 11 is in operation, the detecting unit 113 is used by the communication module 11 to self-detect operation status, such as operating temperature, operating power, operating current, output power, indication of burnout risk, abnormal operation, and etc., so as to generate at least one status information 1131. The status information 1131 is stored in the register 115. The first MIPI 111 used by the communication module 11 transmits data (such as the status information 1131) to the communication device. The communication device is then allowed to acquire the status information 1131 of the communication module 11 via the first MIPI 111 so as to be informed of the current operation status of the communication module 11.

Figure 2:
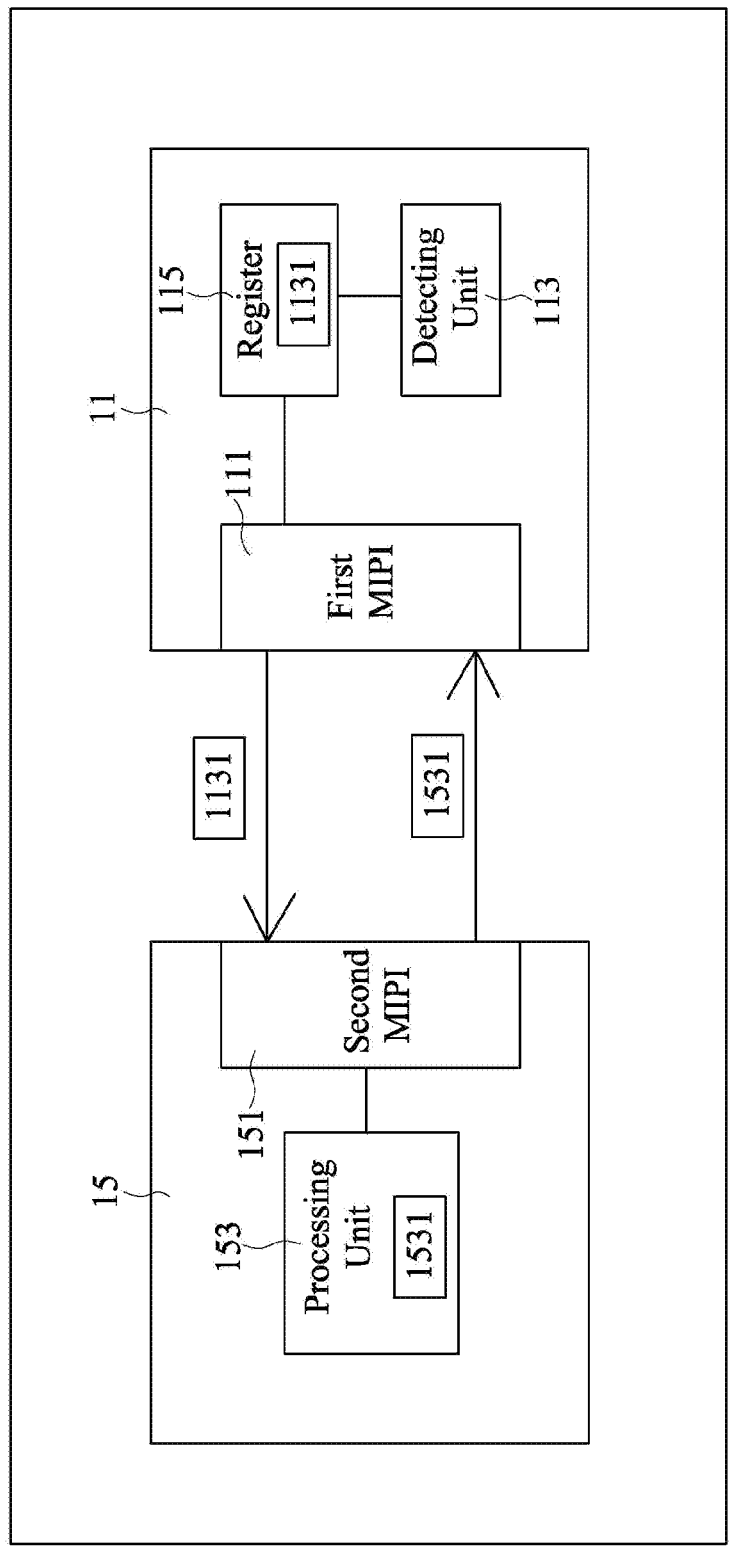
FIG. 2 is a structural diagram of a communication device according to one embodiment of the present invention.

Referring to FIG. 2, there is shown a structural diagram of a communication device according to one embodiment of the present invention. As illustrated in FIG. 2, the communication device 100 comprises the communication module 11 and a control module 15. The control module 15 is a baseband chip, a radio-frequency chip, or a processor chip. The control module 15 comprises a second MIPI 151 and a processing unit 153. The second MIPI 151 is connected to the processing unit 153. The second MIPI 151 is used by the control module 15 to connect with the first MIPI 111 of the communication module 11. Here, the first MIPI 111 and the second MIPI 151 of the present invention are both interfaces comply with hardware standard specifications drawn up by MIPI Alliance.

In the present invention, the processing unit 153 of the control module 15 is allowed to read out the status information 1131 of the communication module 11 from the register 115 of the communication module 11 via the MIPIs 111, 151 periodically, and then diagnose whether the status information 1131 is normal. If the status information 1131 of the communication module 11 is diagnosed by the processing unit 153 to be normal, the processing unit 153 is not performed the adjustment for the operation status of the communication module 11. On the contrary, if the need for the adjustment of operation status of the communication module 11 is determined by the processing unit 153 diagnosing the status information 1131 of the communication module 11, a control signal 1531 is generated by the processing unit 153. This control signal 1531 is transmitted to the communication module 11 via the MIPIs 111, 151, so as to adjust operation status of the communication module 11.

For instance, when the current output power (e.g., 25 dBm) of the communication module 11 higher than the desired upper limit of output power (e.g., 20 dBm) during the specific operating period in a communication system is determined by the processing unit 153 diagnosing the status information 1131, a control signal 1531 for reducing operating power or current is generated by the processing unit 153, and then transmitted to the communication module 11 via the MIPIs 111, 151, such that the communication module 11 is controlled to reduce supply voltage or operating current, thereby reducing the output power of the communication module 11. Otherwise, when the current abnormal operation of the communication module 11 is determined by the processing unit 153 diagnosing the status information 1131, a control signal 1531 is generated for the communication module 11, and this control signal 1531 is transmitted to the communication module 11 via the MIPIs 111, 151, so as to adjust the communication module 11 to restore to normal operation.

For another example, when the current operating temperature (e.g., 80° C.) of the communication module 11 higher than maximum permissible temperature (e.g., 70° C.) is determined by the processing unit 153 diagnosing the status information 1131, a control signal 1531 for reducing supply voltage or operating current is generated, and this control signal 1531 for reducing supply voltage or operating current is transmitted to the communication module 11 via the MIPIs 111, 151, such that the communication module 11 is controlled to reduce supply voltage or operating current, thereby reducing the operating temperature of the communication module 11. Thus, damage to the communication module 11 due to excessively high temperature of the communication module 11 can be avoided.

As such, the control module 15 is allowed to read out the status information 1131 of the communication module 11 via the MIPIs 111, 151, and then determine the need for the adjustment of operation status of the communication module 11 based on the diagnosis of the status information 1131 of the communication module 11, followed by transmitting the control signal 1531 to the communication module 11 via the MIPIs 111, 151, and then adjusting the status information of the communication module 11 by means of the control signal 1531. Thus, the communication module 11 may be operated under its best status and also reduce the probability of overheating or abnormal operation.

In one embodiment of the present invention, the MIPIs 111, 151 comply with RF Front-End Control Interface (RFFE) standard specifications drawn up by MIPI Alliance.

Figure 3:
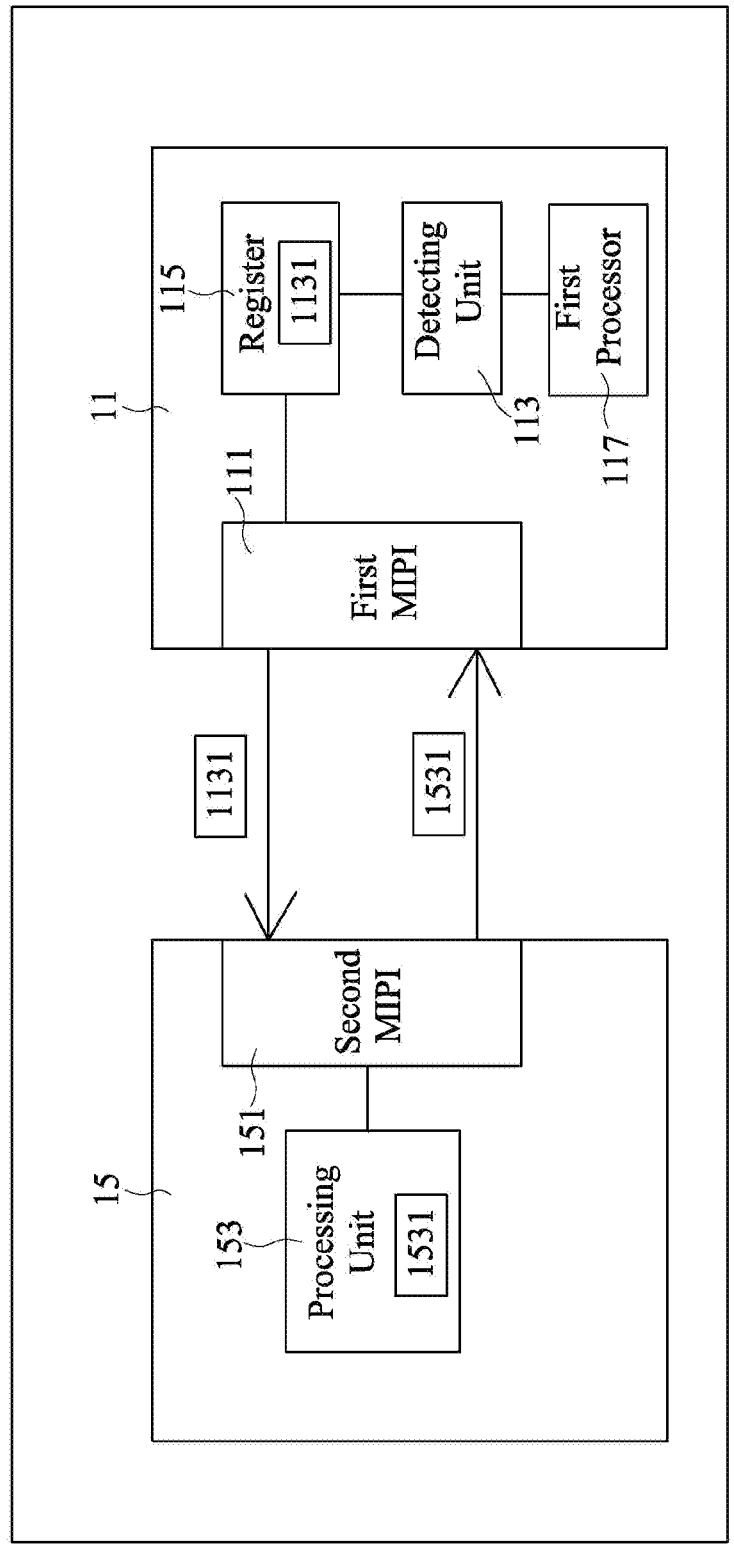
FIG. 3 is a structural diagram of a communication device according to another embodiment of the present invention.

Referring to FIG. 3, there is shown a structural diagram of a communication device according to another embodiment of the present invention. Compared with the communication device 100 of the above embodiment, as illustrated in FIG. 3, the communication module 11 of the communication device 101 of this embodiment further comprises a first processor 117. The first processor 117 is connected to the detecting unit 113.

Accordingly, in one embodiment of the present invention, the control module 15 is allowed to accomplish the detection and adjustment of operation status of the communication module 11 by the use of MIPIs 111, 151.

Otherwise, in another embodiment of the present invention, when the communication module 11 is in operation, the communication module 11 is allowed to self-detect operation status by means of the detecting unit 113, so that the first processor 117 may acquire the information related with operation status. When the need for the adjustment of operation status of the communication module 11 is determined by the first processor 117, a control signal for the adjustment of operation status of the communication module 11 may be generated automatically by the first processor 117. Then, the communication module 11 can detect and adjust itself operation status.

Figure 4:
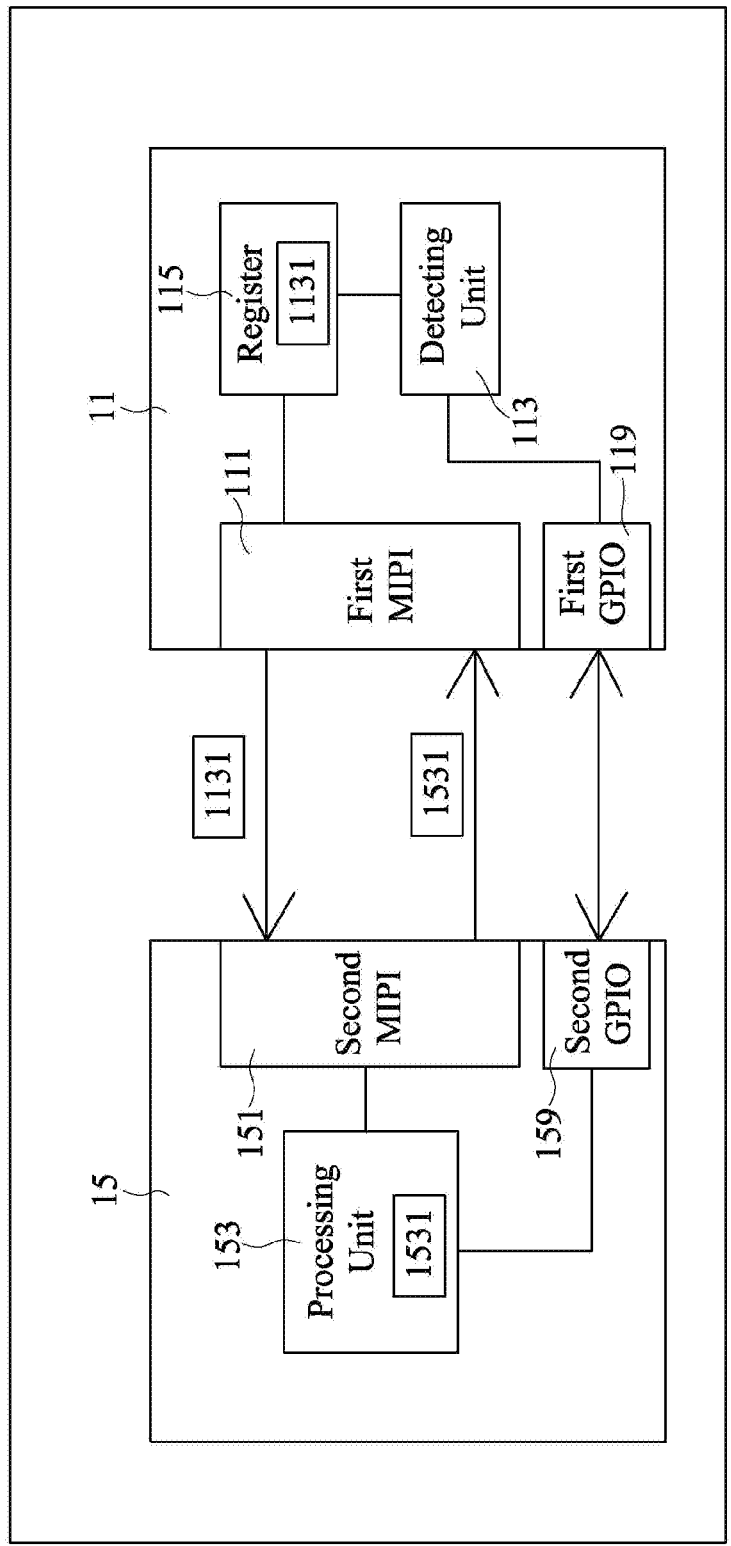
FIG. 4 is a structural diagram of a communication device according to another embodiment of the present invention.

Referring to FIG. 4, there is shown a structural diagram of a communication device according to another embodiment of the present invention. Compared with the communication device 100 of the above embodiment, as illustrated in FIG. 4, the communication module 11 of the communication device 102 of this embodiment further comprises a first General Purpose Input/Output (GPIO) interface 119, while the control module 15 further comprises a second GPIO interface 159. The first GPIO interface 119 is connected to the detecting unit 113, while the second GPIO interface 159 is connected to the processing unit 153.

In the communication device 102 of the present embodiment, signals may be transmitted between the communication module 11 and the control module 15 via the MIPIs 111, 151 or the GIPOs interface 119, 159, selectively.

For example, the control module 15 is allowed to read out operation status of the communication module 11 via the MIPIs 111, 151. When the need for changing operation status of the communication module 11 is determined by the control module 15, a control signal may be generated by the control module 15, and then transmitted to the communication module 11 via the MIPIs 111, 151 or the GPIOs interface 119, 159, so as to adjust operation status of the communication module 11.

On the contrary, otherwise, the control module 15 is allowed to read out operation status of the communication module 11 via the GPIOs interface 119, 159. When the need for changing operation status of the communication module 11 is determined by the control module 15, a control signal may be generated by the control module 15, and then transmitted to the communication module 11 via the MIPIs 111, 151 or the GPIOs interface 119, 159, so as to adjust operation status of the communication module 11.

Figure 5:
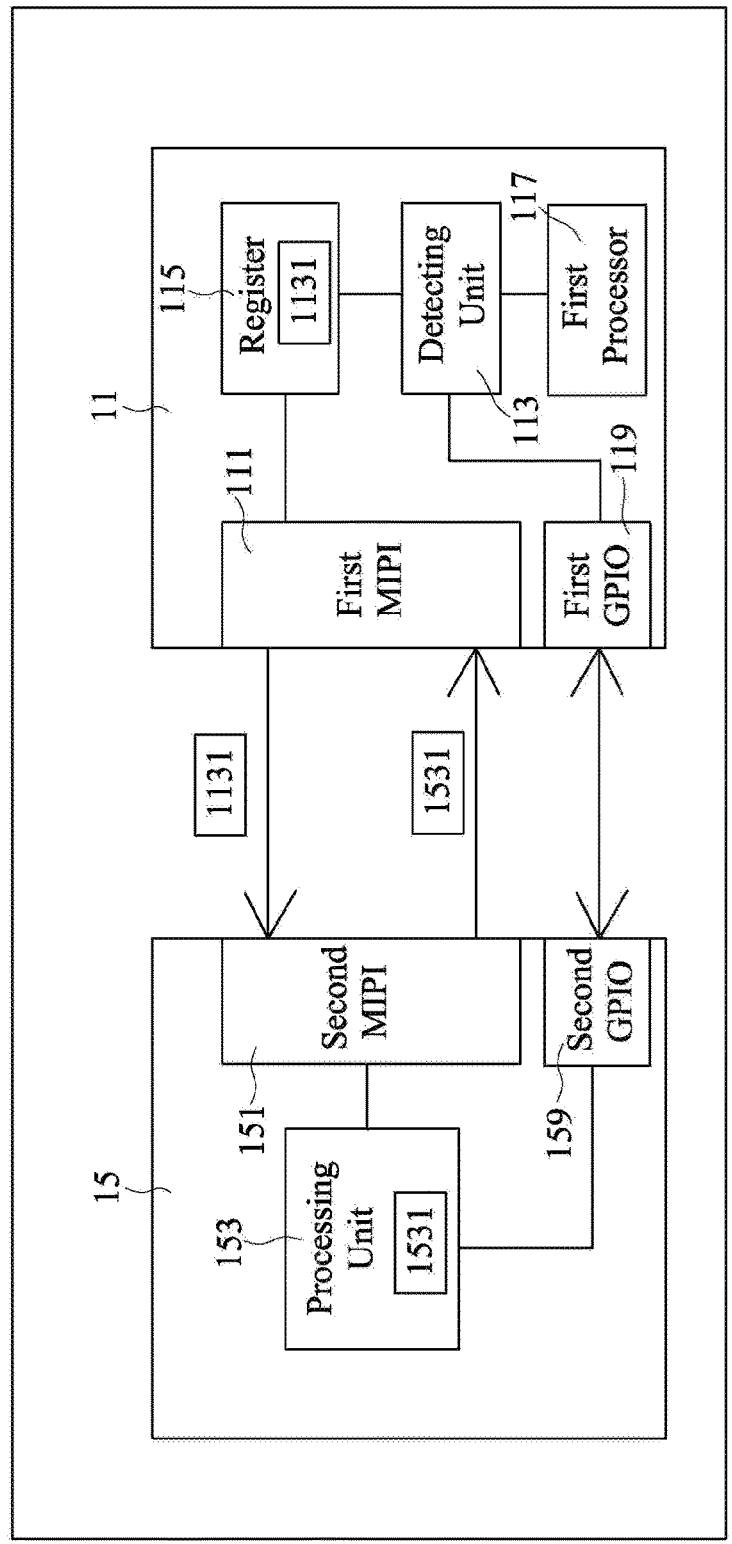
FIG. 5 is a structural diagram of a communication device according to another embodiment of the present invention.

Referring to FIG. 5, there is shown a structural diagram of a communication device according to another embodiment of the present invention. Compared with the communication device 100 of the above embodiment, as illustrated in FIG. 5, the communication module 11 and the control module 15 of the communication device 103 of this embodiment are additionally provided with the GPIOs interface 119, 159 described in FIG. 4. Besides, there is further provided with the first processor 117 described in FIG. 3 additionally.

Self-detection and self-adjustment of operation status may be provided for the communication module 11 by means of the detecting unit 113 and the first processor 117. The communication module 11 and the control module 15 may be proceeded the signal transmission by using the MIPIs 111, 151 so as to read out or adjust operation status of the communication module 11. Otherwise, the communication module 11 and the control module 15 may be proceeded the signal transmission by using the GPIOs interface 119, 159 so as to read out or adjust operation status of the communication module 11.

Figure 6:
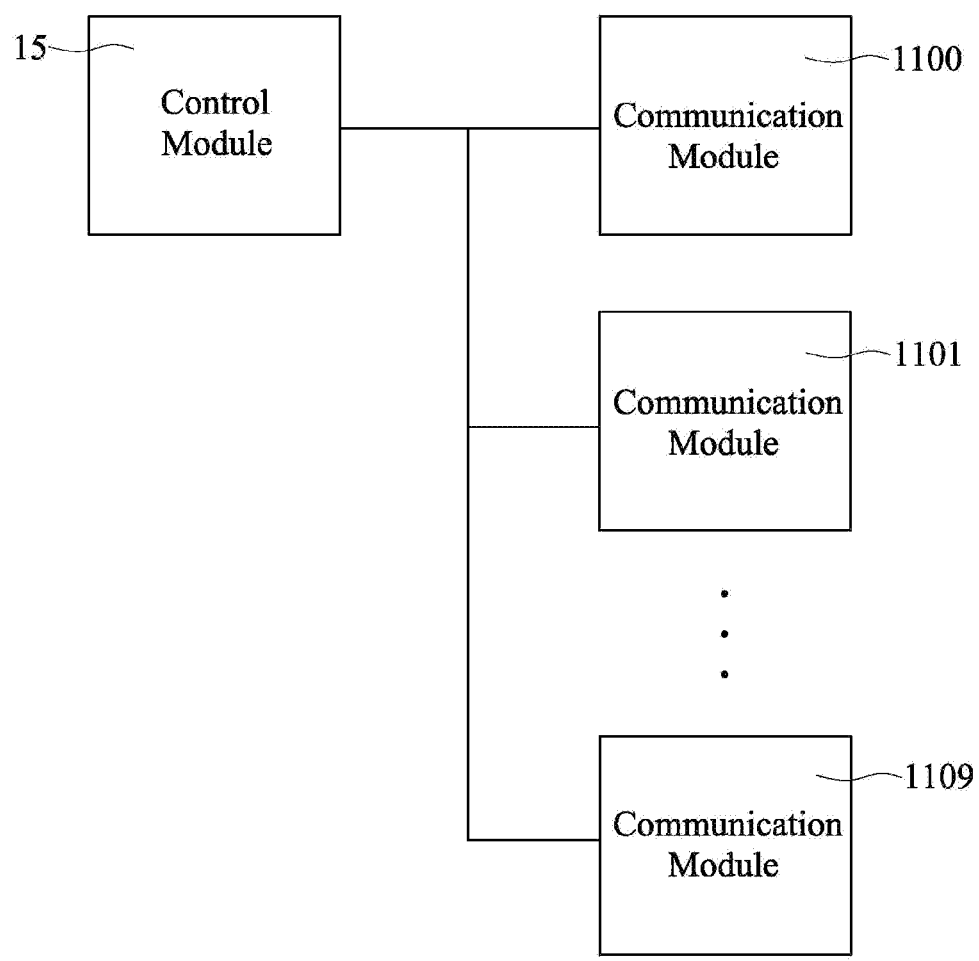
FIG. 6 is a structural diagram of a communication device according to another embodiment of the present invention.

Referring to FIG. 6, there is shown a structural diagram of a communication device according to another embodiment of the present invention. As illustrated in FIG. 6, the communication device 104 of this embodiment comprises a plurality of various types of communication modules 1100, 1101, 1109 and a control module 15. The control module 15 is connected to each of various types of the communication modules 1100, 1101, 1109 via the MIPIs, respectively. In this embodiment, the control module 15 is allowed to read out status information of each of the communication modules 1100, 1101, 1109 periodically via the MIPIs, respectively.

When the need for the adjustment of operation status of a part of communication modules (e.g., the communication module 1100 and the communication module 1109) is determined by the processing module 153 of the control module 15 diagnosing the status information of each of the communication modules 1100, 1101, 1109, a corresponding control signal to each of the communication module 1100 and the communication module 1109, respectively, may be generated by the control module 15. Then, each control signal is transmitted to the communication module 1100 and the communication module 1109, respectively, via the MIPI, so as to adjust operation status of the communication module 1100 and the communication module 1109.

In a communication device according to another embodiment of the present invention, each of the communication modules 1100, 1101, 1109 is provided therein with the detecting unit and the processor (e.g., the detecting unit 113 and the first processor 117 in FIG. 3). Each of the communication modules 1100, 1101, 1109 may be self-detecting and self-adjusting operation status by the internal detecting unit and processor. Self-detection and self-adjustment of operation status may be provided for each of the communication modules 1100, 1101, 1109 by means of the detecting unit and the processor therein.

In a communication device according to another embodiment of the present invention, it is also possible for the communication modules 1100, 1101, 1109 to read out operation status of each other via the MIPI. Moreover, the processor inside one communication module may be used to determine whether the adjustment of operation statuses of other communication modules is needed. When the adjustments of operation statuses of other communication modules are needed, a control signal is then generated by the processor inside the one communication module, and then transmitted to those other communication modules, where the adjustments of operation statuses are needed, via the MIPI, so as to change operation statuses of those other communication modules.

Figure 7:
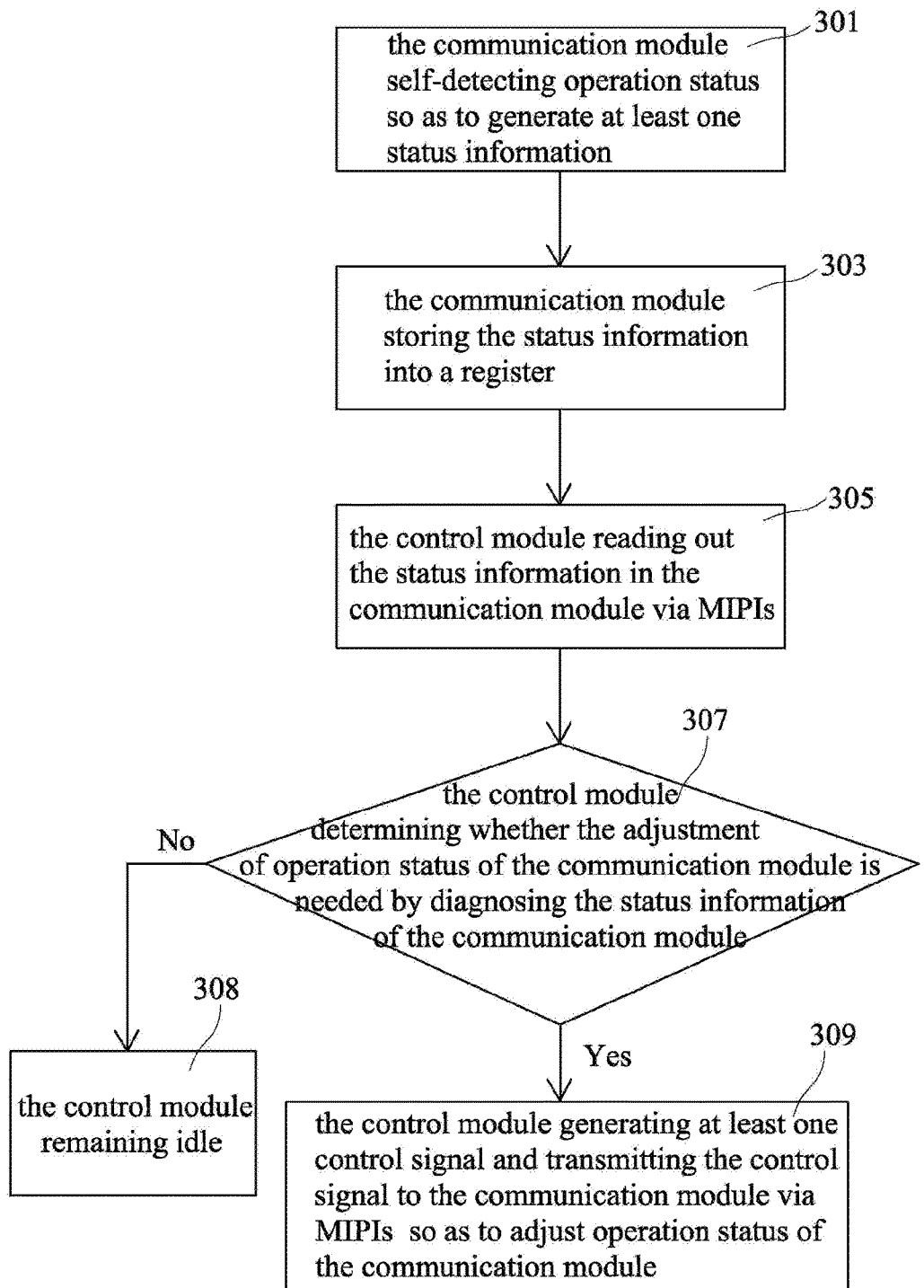
FIG. 7 is a flow chart of a method for detecting operation status of a communication device according to one embodiment of the present invention.

Referring to FIG. 7, there is shown a flow chart of a method for detecting operation status of a communication device according to one embodiment of the present invention. Referring to FIG. 2 together, firstly, the communication module 11 is allowed for self-detection of operation status by means of the detecting unit 113, so as to generate at least one status information 1131, as illustrated in step S301.

As illustrated in step S303, the status information 1131 is stored in the register 115 by the communication module 11. As illustrated in step S305, the control module 15 is allowed to read out the status information 1131 of the communication module 11 via the MIPIs 111, 151, and the control module 15 is informed of the current operation status of the communication module 11.

In another embodiment of the present invention, as illustrated in step S307, the processing unit 153 of the control module 15 is allowed to further perform a diagnostic procedure on operation status of the communication module 11. The processing unit 153 of the control module 15 is allowed to determine whether the adjustment of operation status of the communication module 11 is needed by diagnosing the status information 1131 of the communication module 11. If no need for the adjustment of operation status of the communication module 11 is determined by the processing unit 153 of the control module 15 diagnosing the status information 1131 of the communication module 11, the procedure proceeds to step S308 with the processing unit 153 of the control module 15 remaining idle. On the contrary, if the need for the adjustment of operation status of the communication module 11 is determined by the processing unit 153 of the control module 15 diagnosing the status information 1131 of the communication module 11, the procedure proceeds to step S309, where at least one control signal 1531 is generated by the processing unit 153 of the control module 15, and then transmitted to the communication module 11 via the MIPIs 111, 151, so as to adjust operation status of the communication module 11.

Figure 8:
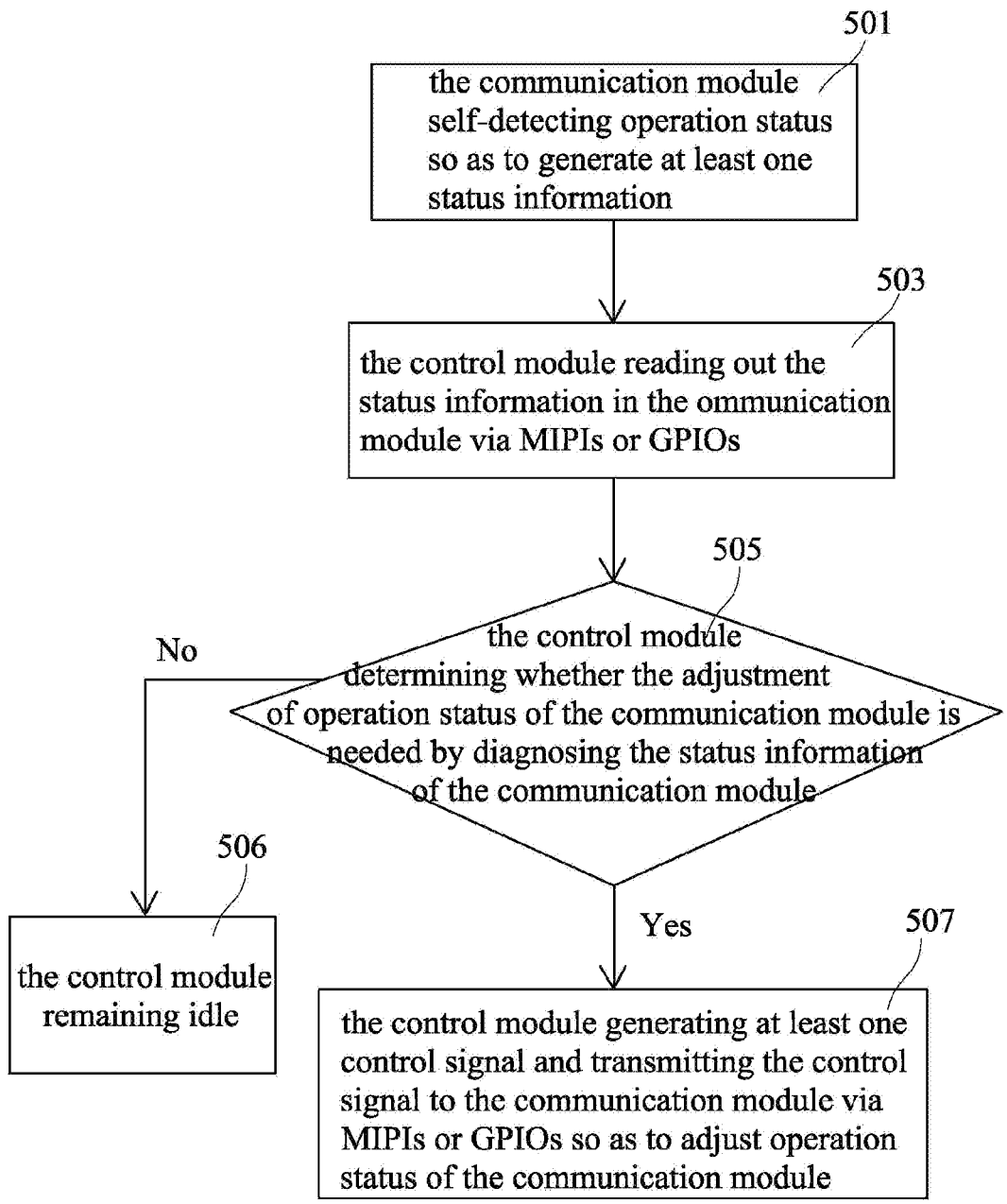
FIG. 8 is a flow chart of a method for detecting operation status of a communication device according to another embodiment of the present invention.

Referring to FIG. 8, there is shown a flow chart of a method for detecting operation status of a communication device according to another embodiment of the present invention. Referring to FIG. 4 together, firstly, the communication module 11 is allowed for self-detection of operation status by means of the detecting unit 113, so as to generate at least one status information 1131, as illustrated in step S501.

As illustrated in step S503, the control module 15 is allowed to read out status information 1131 of the communication module 11 via the MIPIs 111, 151 or the GPIOs interface 119, 159, and the control module 15 is informed of the current operation status of the communication module 11.

In another embodiment of the present invention, as illustrated in step S505, when no need for the adjustment of operation status of the communication module 11 is determined by the processing unit 153 of the control module 15, the procedure proceeds to step S506 with the processing unit 153 of the control module 15 remaining idle. On the contrary, if the need for the adjustment of operation status of the communication module 11 is determined by the processing unit 153 of the control module 15 diagnosing the operation information 1131 of the communication module 11, the procedure proceeds to step S507, where at least one control signal 1531 is generated by the processing unit 153 of the control module 15, and the control signal 1531 is transmitted to the communication module 11 via the MIPIs 111, 151 or the GPIOs interface 119, 159, so as to adjust operation status of the communication module 11.

In various embodiments of the present invention, each of the MIPIs 111, 151 complies with standard specifications for RF Front-End Control Interface (RFFE) drawn up by MIPI Alliance.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A communication device capable of self-adjusting an operation mode, the communication device comprising:
   at least one communication module, including:
      a detector configured to measure a predetermined parametric operation condition of said communication module, so as to generate at least one condition indicator, and
      a communication module Mobile Industry Processor Interface (MIPI); and
   a control module, including:
      a control module MIPI coupled to said communication module MIPI of said communication module to form a MIPI pair, and
      a control processor coupled to said control module MIPI, said control processor configured to read said condition indicator of said communication module and to selectively generate a control signal based on said condition indicator,
   wherein said condition indicator and said control signal are both transmitted between modules through said MIPI pair, and
   wherein said communication module adjusts an operation mode responsive to said control signal.

2. The communication device according to claim 1, wherein each of a plurality of communication modules includes a communication module MIPI coupled to the control module MIPI to form a MIPI pair corresponding to said communication module,
   wherein said control processor of said control module is configured to read said condition indicator of each of said communication modules and to selectively generate a control signal based on each condition indicator, and
   wherein said condition indicators and said control signals are transmitted between said control module and one of said communication modules through the MIPI pair corresponding to said communication module.

3. The communication device according to claim 1, wherein said control module is one of a baseband chip, a radio-frequency chip, and a processor chip.

4. The communication device according to claim 1, wherein said communication module is one of a transmitter module, a receiver module, a power amplifier module, an antenna switch module, and a front end module.

5. The communication device according to claim 1, wherein said communication module further includes a register configured to store said condition indicator.

6. The communication device according to claim 1, wherein said communication module MIPI and said control module MIPI comply with RF Front-End Control Interface (RFFE) standard specifications drawn up by MIPI Alliance.

7. The communication device according to claim 1, wherein:
   the predetermined parametric operation condition of the communication module is one of an operating temperature, operating power, operating current, and output power, and
   the detector is a sensor configured to measure said condition.

8. A communication device capable of self-adjusting an operation mode, the communication device comprising:
   at least one communication module, including:
      a detector configured to measure a predetermined parametric operation condition of said communication module, so as to generate at least one condition indicator,
      a communication module processor configured to read said condition indicator and to selectively generate a control signal based on said condition indicator, and
      a communication module Mobile Industry Processor Interface (MIPI); and
   a control module, including:
      a control module MIPI coupled to said communication module MIPI of said communication module to form a MIPI pair, and
      a control processor coupled to said control module MIPI, said control processor configured to read said condition indicator of said communication module and to selectively generate a control signal based on said condition indicator,
   wherein said control signal generation is selectively executed by one of the communication module processor and the control processor,
   wherein, when said control processor generates said control signal, said condition indicator and said control signal are both transmitted between modules through said MIPI pair, and
   wherein said communication module adjusts an operation mode responsive to said control signal.

9. The communication device according to claim 8, wherein each of a plurality of communication modules includes a communication module MIPI and a communication module processor, wherein said communication module processor of each of said communication modules is configured to read said condition indicator of at least one additional communication module and to selectively generate a control signal based on each condition indicator, and wherein said condition indicators and said control signals are transmitted between communication modules through respective communication module MIPIs of said communication modules.

10. The communication device according to claim 8, wherein each of a plurality of communication modules has a communication module MIPI coupled to the control module MIPI to form a MIPI pair corresponding to said communication module, wherein said control processor of said control module is configured to read said condition indicator of each of said communication modules and to selectively generate a control signal based on each condition indicator, and wherein said condition indicators and said control signals are transmitted between said control module and one of said communication modules through the MIPI pair corresponding to said communication module.

11. The communication device according to claim 8, wherein said communication module MIPI and said control module MIPI comply with RF Front-End Control Interface (RFFE) standard specifications drawn up by MIPI Alliance.

12. The communication device according to claim 8, wherein:

the predetermined parametric operation condition of the communication module is one of an operating temperature, operating voltage, operating current, indication of burnout risk, and output power, and the detector is a sensor configured to measure said condition.

13. A method for self-adjusting an operation mode of a communication device, said communication device including a control module and at least one communication module, said control module and said communication module each including a Mobile Industry Processor Interfaces (MIPI), said control module MIPI and said communication module MIPI being coupled to each other to form a MIPI pair, said method comprising:

measuring a predetermined parametric operation condition of said communication module so as to generate at least one condition indicator;

storing said condition indicator into a register of said communication module;

reading said condition indicator of said communication module by said control module;

generating a control signal based on said condition indicator; and adjusting an operation mode of said communication module responsive to said control signal;

wherein said condition indicator and said control signal are both transmitted between modules through said MIPI pair.

14. The communication device according to claim 13, wherein:

the predetermined parametric operation condition of the communication module is one of an operating temperature, operating voltage, operating current, indication of burnout risk, and output power, and the detector is a sensor configured to measure said condition.

15. A communication device capable of self-adjusting an operation mode, the communication device comprising:

at least one communication module, including:

a detector configured to measure a predetermined parametric operation condition of said communication module, so as to generate at least one condition indicator, a communication module Mobile Industry Processor Interface (MIPI), and a communication module General Purpose Input/Output (GPIO) interface; and a control module, including:

a control module MIPI coupled to said communication module MIPI of said communication module to form a MIPI pair, a control module GPIO interface coupled to said communication module GPIO interface of said communication module to form a GPIO pair, and a control processor coupled to said control module MIPI and said control module GPIO interface, said control processor configured to read said condition indicator of said communication module and to selectively generate a control signal based on said condition indicator, wherein said condition indicator and said control signal are both transmitted between modules through one of said MIPI pair and said GPIO pair, and wherein said communication module adjusts an operation mode responsive to said control signal.

16. The communication device according to claim 15, wherein said condition indicator and said control signal are both transmitted between modules through said MIPI pair.

17. The communication device according to claim 15, wherein said condition indicator and said control signal are both transmitted between modules through said GPIO pair.

18. The communication device according to claim 15, wherein:

the predetermined parametric operation condition of the communication module is one of an operating temperature, operating voltage, operating current, indication of burnout risk, and output power, and the detector is a sensor configured to measure said condition.

19. A communication device capable of self-adjusting an operation mode, the communication device comprising:

at least one communication module, including:

a detector configured to measure a predetermined parametric operation condition of said communication module, so as to generate at least one condition indicator, a communication module processor configured to read said condition indicator and to selectively generate a control signal based on said condition indicator, and a communication module Mobile Industry Processor Interface (MIPI), and a communication module General Purpose Input/Output (GPIO) interface; and a control module, including:

a control module MIPI coupled to said communication module MIPI of said communication module to form a MIPI pair, a control module GPIO interface coupled to said communication module GPIO interface of said communication module to form a GPIO pair, and a control processor coupled to said control module MIPI and said control module GPIO interface, said control processor configured to read said condition indicator of said communication module and to selectively generate a control signal based on said condition indicator, wherein said control signal generation is selectively executed by one of said communication module processor and said control processor, wherein, when said control processor generates said control signal, said condition indicator and said control signal are both transmitted between modules through one of said MIPI pair and said GPIO pair, and wherein said communication module adjusts an operation mode responsive to said control signal.

20. The communication device according to claim 19, wherein said condition indicator and said control signal are both transmitted between modules through said MIPI pair.

21. The communication device according to claim 19, wherein said condition indicator and said control signal are both transmitted between modules through said GPIO pair.

22. The communication device according to claim 19, wherein:

the predetermined parametric operation condition of the communication module is one of an operating temperature, operating voltage, operating current, indication of burnout risk, and output power, and the detector is a sensor configured to measure said condition.

* * * * *